Sept. 15, 1931. H. GEIGER 1,823,394
DISK VALVE
Filed Jan. 10, 1930  2 Sheets-Sheet 1
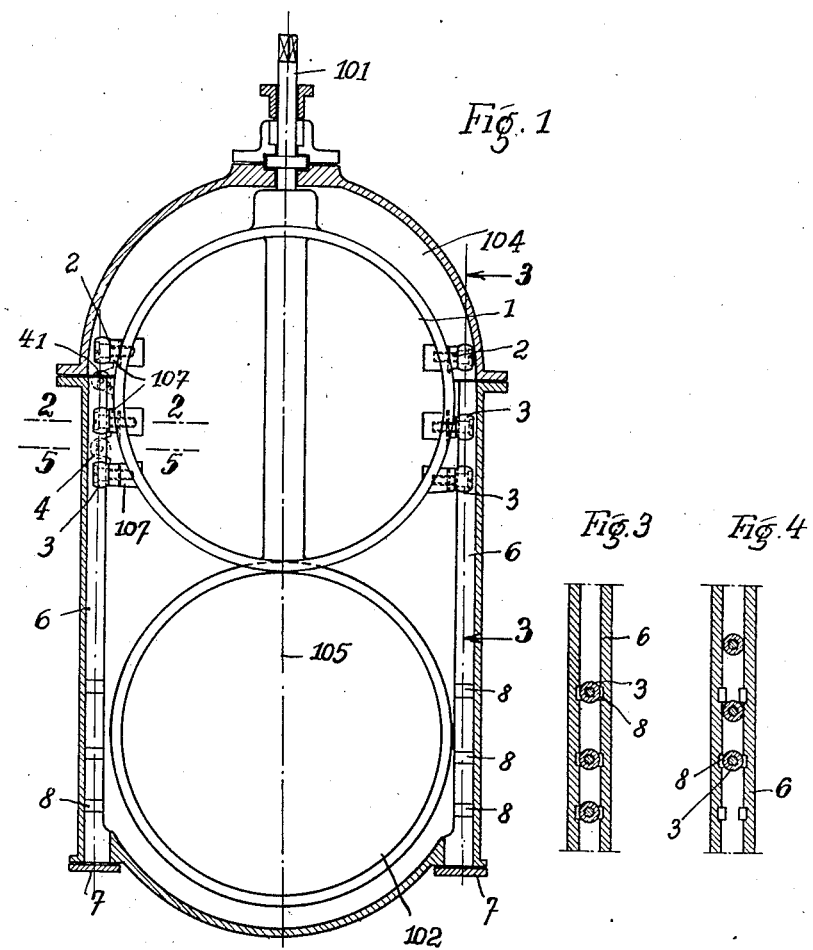
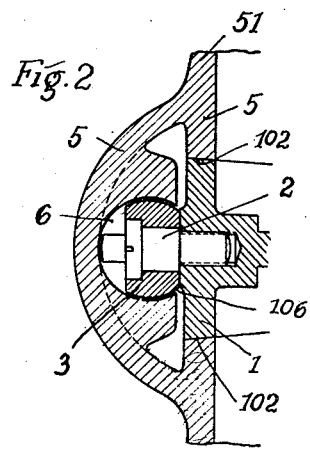
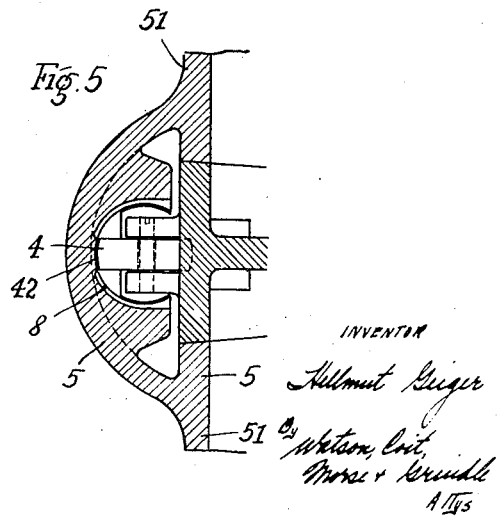

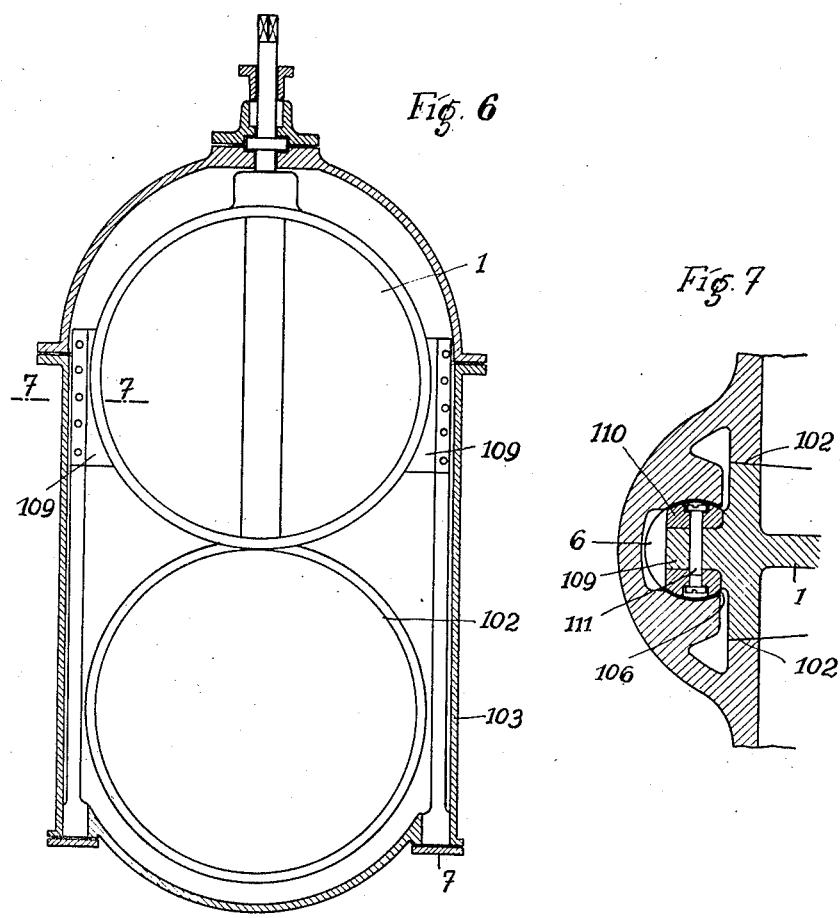

Patented Sept. 15, 1931

1,823,394

UNITED STATES PATENT OFFICE

HELLMUT GEIGER, OF BAD SODEN IN THE TAUNUS, GERMANY

DISK VALVE

Application filed January 10, 1930, Serial No. 419,937, and in Germany December 7, 1928.

My invention relates to improvements in disk valves, and the object of the improvements is to provide a valve in which the casing enclosing the disk consists of an integral body, and in which the guide ways for the valve disk are constructed so that they can be readily worked. With this object in view my invention consists in constructing the guide ways for the valve disk in the form of cylindrical bores located parallel to the axis of the valve, and providing the valve disk with guide members engaging the said bores. The said cylindrical bores can be manufactured by means of a drill or a similar tool inserted into the valve box from one side thereof, and they are disposed within the wall of the box so that they are connected with the inner part of the box by longitudinal slots through which the guide members of the disk are passed into the same.

It has heretofore been proposed to provide guideways in valve casings of this type having flat surfaces for contact with the cooperating guide elements on the valve plate and since it is desirable to form the casings in one piece in order to avoid the use of packing, particularly in the manufacture of the larger valves, it has been found quite difficult to machine these guideways with sufficient accuracy to ensure proper seating of the valve. Specially designed apparatus is required for these larger casings and the work must be done on the inside of the casing in which the space is extremely limited. Consequently the expense of making the larger valves is tremendously increased.

With the present arrangement the guideways are formed by the simple expedient of drilling through the casing on either side of the valve chamber and both guideways can be simultaneously drilled by the use of two spindle drills and the length of time required for manufacture of the valve correspondingly reduced.

For the purpose of explaining the invention two examples embodying the same have been shown in the accompanying drawings in which the same reference characters have been used in all the views to indicate corresponding parts. In said drawings, Fig. 1 is a sectional elevation showing the valve, Fig. 2 is a sectional plan view on an enlarged scale taken on the line 2—2 of Fig. 1, Fig. 3 is a sectional elevation taken on the line 3—3 of Fig. 1, Fig. 4 is a similar elevation showing the parts in a different position, Fig. 5 is a sectional plan view taken on the line 5—5 of Fig. 1, Fig. 6 is a sectional elevation similar to the one illustrated in Fig. 1 and showing a modification of the valve, and Fig. 7 is a sectional plan view taken on the line 7—7 of Fig. 6.

In the example shown in Figs. 1 to 5 the valve comprises a substantially rectangular integral casing 5 formed with tubular extensions 51 adapted to be connected to the main, and a hood 104 adapted to be fixed to the open top part of the casing. Within the said casing a valve disk 1 is mounted which is adapted to be moved upwardly or downwardly by means of a valve stem 101 of any known or preferred construction, Fig. 1 showing the valve disk in elevated position in which the main is open. When shifting the valve disk downwardly the main is closed by the valve disk being placed on the circular seats 102, the valve disk and its seats 102 being slightly wedge-shaped, as is known in the art.

At opposite sides the casing 5 is formed with bores 6 disposed parallel to the axis 105 of the valve disk and extending the whole length thereof, the said bores being open at their inner sides, as is shown in Fig. 2 at 106. The said bores 6 can be readily manufactured by means of a drill or another suitable tool. At their bottom ends the said bores are closed by lids 7.

The valve disk 1 is formed at opposite sides with lugs 107 providing seats for pivot bolts 2 screwing in the said lugs and carrying rollers 3 having spherical bearing surfaces and engaging the cylindrical walls of the bores 6. Thus, when the disk 1 is moved upwardly or downwardly it is guided by means of the rollers 3 on the walls of the bores 6, the pressure acting on the disk being transmitted through the rollers 3 on the walls of the said bores.

Near the bottom ends of the bores 6 recesses 8 are provided in the walls of the bores which correspond in position to the rollers 3 when the valve disk 1 is in its lowermost position for perfectly closing the main. Therefore, in this position of the valve the rollers are not supported any more on the walls of the bores 6, and the disk is brought into tight engagement with the seats 102. As appears from Figs. 3 and 4 the rollers 3 and recesses 8 are different distances apart, so that when moving the disk 1 with its rollers 3 away from the recesses 8 only one of the said rollers is in position for engaging a recess 8, while the other rollers are adapted to support the disk on the wall of the bores 6, as is shown in Fig. 4.

As appears from Figs. 1 and 5, the valve disk is formed at one side with lugs 41 providing bearings for rollers 4 adapted to engage the outer portion 42 of the wall of the bore 6, the said rollers supporting the valve disk when the box 5 is mounted in inclined or horizontal position, so that the rollers 3 are relieved of the pressure acting in the direction of their axes.

In Figs. 6 and 7 I have shown a modification in which the valve disk 1 is provided at opposite sides with elongated lugs or ears 109 extending through the slots 106 into the bores 6 of the valve casing. The said lugs are lined at both sides by guide rails 110 having cylindrical outer faces corresponding to the bores 6, and the said rails are fixed in position by means of screws 111. As appears from Fig. 7, the rails 110 fit in the bores 6 with a slight clearance, so that the valve disk 1 is adapted for tight engagement with the seats 102. By reason of the cylindrical form of the rails 110 the valve disk 1 is supported not only in the direction of the fluid pressure on the face of the disk, but also in transverse direction, so that when mounting the box in inclined or horizontal position separate guide members for taking up the weight of the disk and corresponding to the rollers 4 shown in Figs. 1 and 5 may be dispensed with.

With the construction shown in Figs. 1 to 5 the disk can be guided in the bores 6 almost without any play, because in the lowermost position of the disk in which the main is closed the rollers 3 are relieved of pressure by reason of the recesses 8, so that in this position they do not exert any pressure on the disk 1, and the said disk is pressed by the fluid on one of the seats 102.

While in describing the invention reference has been made to two particular examples embodying the same I wish it to be understood that my invention is not limited to the constructions shown in the drawings, and that various changes may be made in the general arrangement of the apparatus and the construction of its parts without departing from the invention.

I claim:

1. In a relatively large gate valve, the combination with a one piece casing disposed transversely of the conduit to be controlled by the valve and providing a guide for the valve disk, of a valve disk within said casing and shiftable transversely of the conduit, said casing being formed at opposite sides with cylindrical bores open at their inner sides and located parallel to the direction of the movement of the valve disk, and said valve disk being provided with supporting members extending into said bores and into engagement with the walls thereof.

2. In a relatively large gate valve, the combination with a one piece casing disposed transversely of the conduit to be controlled by the valve and providing a guide for the valve disk, of a valve disk within said casing and shiftable transversely of the conduit, said casing being formed at opposite sides with cylindrical bores open at their inner sides and located parallel to the direction of the movement of the valve disk, and said valve disk being provided with supporting members having round bearing faces extending into said bores and into engagement with the walls thereof.

3. In a relatively large gate valve, the combination with a one piece casing disposed transversely of the conduit to be controlled by the valve and providing a guide for the valve disk, of a valve disk within said casing and shiftable transversely of the conduit, said casing being formed at opposite sides with cylindrical bores open at their inner sides and located parallel to the direction of the movement of the valve disk, and rollers having spherical bearing faces mounted on said disk and on axes disposed transversely of the direction of the movement thereof and extending into said bores and into position for bearing on the cylindrical walls thereof.

4. In a relatively large gate valve, the combination with a one piece casing disposed transversely of the conduit to be controlled by the valve and providing a guide for the valve disk, of a valve disk within said casing and shiftable transversely of the conduit, said casing being formed at opposite sides with cylindrical bores open at their inner sides and located parallel to the direction of the movement of the valve disk, rollers having spherical bearing faces mounted on said disk and on axes disposed transversely of the direction of the movement thereof and extending into said bores and into position for bearing on the cylindrical wall thereof, and rollers mounted on said disk and on axes disposed perpendicularly of the plane of the disk in position for engaging the walls of the bore.

5. In a relatively large gate valve, the combination with a one piece casing disposed transversely of the conduit to be controlled by the valve and providing a guide for the valve disk, of a valve disk within said casing and shiftable transversely of the conduit, said casing being formed at opposite sides with cylindrical bores open at their inner sides and located parallel to the direction of the movement of the valve disk, and said valve disk being provided with elongated supporting members having cylindrical bearing faces and extending into said bores and into engagement with the walls thereof.

6. In a relatively large gate valve, the combination with a one piece casing disposed transversely of the conduit to be controlled by the valve and providing a guide for the valve disk, of a valve disk within said casing and shiftable transversely of the conduit, said casing being formed at opposite sides with cylindrical bores open at their inner sides and located parallel to the direction of the movement of the valve disk, and said valve disk being provided with elongated bearing members extending into said bores and having cylindrical linings removably fixed thereto in position for engaging the walls of said cylindrical bores.

In testimony whereof I hereunto affix my signature.

HELLMUT GEIGER.